Jan. 4, 1949.  A. BIDDLE  2,458,243
ALUMINUM COVERED GLASS THREAD
Filed Aug. 2, 1946
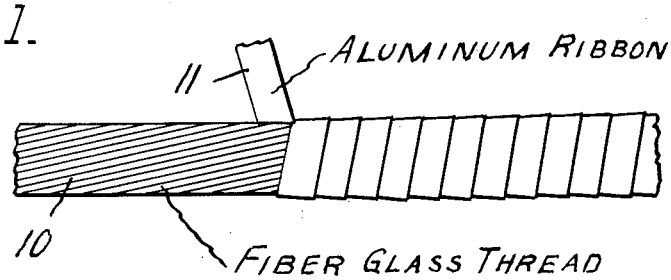
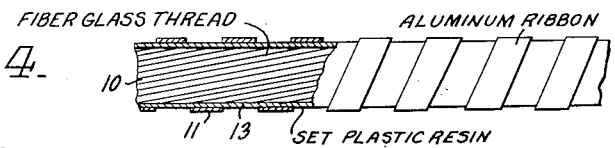
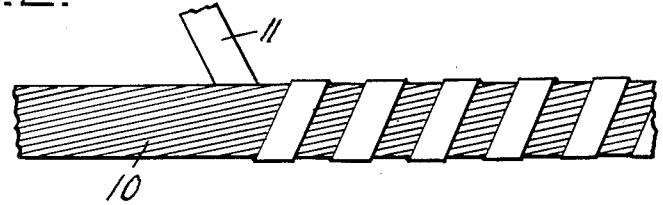
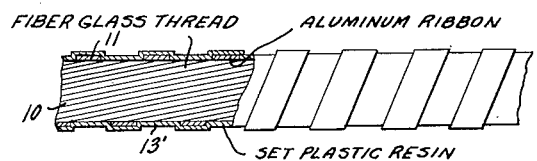
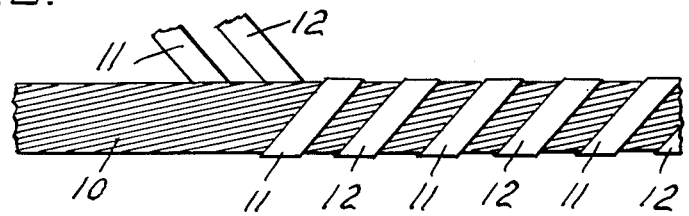
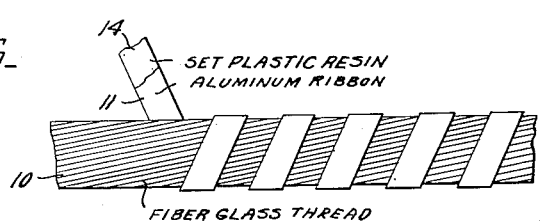
INVENTOR
ARTHUR BIDDLE
BY
Pennie Edmonds Morton & Barrows
ATTORNEYS Patented Jan. 4, 1949

2,458,243

UNITED STATES PATENT OFFICE 2,458,243

ALUMINUM COVERED GLASS THREAD

Arthur Biddle, Richmond, Va., assignor to Reynolds Metals Company, Richmond, Va., a corporation of Delaware Application August 2, 1946, Serial No. 687,990

17 Claims. (Cl. 57—140)

My invention relates to a novel type of composite thread or yarn possessing a new and unusual combination of desirable properties, and to other yarns, sheet materials, and various structural shapes, braided, woven, knitted, felted, or otherwise fabricated from such composite threads or yarns. More particularly, my invention relates to a composite thread or yarn comprising a central glass core covered with an outer metallic sheath provided by spirally winding one or more metallic threads, wires, or ribbons, preferably a thin narrow strip or ribbon of aluminum foil, around the central glass core, and to articles fabricated from such composite threads, especially yarns and sheet materials in which such composite threads are interlocked as by braiding, knitting, weaving, or the like. The central glass core of my composite thread or yarn may be of any desired transverse cross-sectional shape, and it may consist of a single glass filament or a plurality of glass filaments twisted, braided, or otherwise bonded togther.

Composite threads or yarns produced by twisting a thin strip of metallic foil around cores consisting of threads of such materials as cotton, wool, jute and silk, as well as rayon, nylon and a variety of plastic filaments or yarns have heretofore been proposed. However, the properties of these previously proposed composite threads are such as to limit their usefulness. They do not have great tensile strength, and they do not have satisfactory resistance to fire. Moreover, the core materials are susceptible to the destructive action of insects, to mold growth, and to disintegration or corrosion by the action of chemicals.

Glass thread is known to have high tensile strength. However, when glass threads are woven, knitted, braided or the like, they are materially weakened by the tendency of the glass fibers to break up as the result of friction between the glass fibers during the weaving, knitting, braiding, or other fabricating operation. This same deteriorating effect, resulting from friction between the glass fibers, also becomes evident when finished sheet materials or other articles fabricated from glass threads are subjected to flexing or to abrasive action in service. Moreover, sheet materials fabricated from ordinary glass threads are poor reflectors with respect to both sound waves and heat or electric waves.

I have found that when glass threads or filaments are provided with metallic sheaths, by spirally winding thereon a metallic thread, wire, or a narrow ribbon of thin metal foil, the high tensile strength of the glass thread or filament is retained by the resulting composite threads while the friction between the glass fibers, when the resulting composite threads are fabricated into a yarn, sheet material, or the like, as well as when the fabricated articles are subjected to flexing in service, is greatly reduced. I have found that in articles fabricated from my composite threads deterioration of the glass fibers of the central core during fabrication and during flexing in subsequent service, is greatly reduced probably as a result, at least in part, of lower friction between the metallic surfaces. I have found that in articles fabricated from my composite threads or filaments, deterioration of the glass fibers of the central core, occasioned by friction during fabrication or flexing in service, is particularly low when the spirally wound metallic sheath is made from a ribbon of aluminum or an aluminum alloy consisting predominantly of aluminum.

Due to the slight deterioration of the glass fibers when they are incorporated in such composite threads, articles fabricated from such composite threads or filaments, retain their usefulness over prolonged periods of time. Moreover, as compared to articles fabricated from ordinary glass threads or filaments, they are better reflectors of sound waves as well as heat and electric waves. Articles fabricated from my composite threads, e. g., fire curtains that may be repeatedly rolled with little deterioration, exhibit greater resistance to fire probably as a result of their greater reflectivity of heat waves. As compared to composite metal-covered threads employing inner cores consisting of cotton, wool, jute, silk or plastics, and to articles fabricated therefrom, the composite threads of my invention and articles fabricated therefrom have the further advantage of reduced susceptibility to the destructive action of insects, to mold growth, and to disintegration or corrosion by the action of chemicals.

In the composite threads or yarns of my invention the outer metallic sheath ordinarily covers the central glass core completely, although composite threads and yarns adapted for special purposes may be produced by winding metallic strips around the central glass core in the form of a spiral having a pitch substantially greater than the width of the metallic strips so that the central glass core will be only partially covered.

The composite threads of my invention may be produced by the use of procedures and apparatus of the types heretofore used in the production of other spirally covered composite threads or yarns. For example, the glass filaments or thread for the central core may be drawn from a spool or spools placed on a spindle and the glass filament or thread caused to pass through a tension device onto a take-up roll. A spool of metallic thread or ribbon may be placed on another spindle, directly above the portion of the glass core material which is being held under tension, and caused to rotate about the central core as an axis, so that the metallic thread or ribbon will be spirally wrapped around the glass core as it moves forward and onto the take-up roll. The metallic thread or ribbon also is held under tension as the spindle from which it is supplied rotates about the glass core. The relationship of the rate at which the glass thread passes through the tension device and onto the take-up roll, to the rate at which the spindle carrying the spoool of metallic thread or ribbon rotates around the axially positioned glass core may, by the selection of appropriate gears, be adjusted with reference to the diameter of the glass core and the width of the metallic thread or ribbon, so that the pitch of the spiral formed by the metallic thread or ribbon as it wraps around the central glass core will be such as to provide a complete metallic covering for the central glass core. This relationship also may be varied to produce only a partial metallic covering of the central glass core where the eventual composite thread, or article fabricated therefrom, is to be used essentially for decorative purposes. Where the composite thread is to be used essentially for decorative purposes, as little as 1% of the exterior surface of the central glass core may be covered by the metallic winding.

When the composite threads of my invention are to be fabricated into a woven sheet material, any of the processes now employed in the weaving of cloth, and especially those employed in the weaving of glass cloth, may be used.

The transverse dimensions of the central glass core, as well as the diameter and number of individual glass filaments incorporated therein, in order to obtain the most desirable product, will depend upon the eventual use to which the composite thread or article fabricated therefrom is to be put. The same applies to the metallic threads or ribbons that are spirally wound around the central glass core. Glass threads of extremely small diameter have sufficient tensile strength to stand up under severe operational stresses. However, the dimensions of the metallic thread or ribbon must be selected with a view of providing adequate strength to stand up under the mechanical operations to which it is subjected. These will vary with the particular metal involved and the temper of the metal. With metallic ribbons formed of metals of relatively high tensile strength a dead soft or fully annealed metal is usually desirable, whereas with metals of relatively low tensile strength the temper may vary from half hard to full hard. In the case of aluminum ribbon, I have found that a temper providing a three-quarter to full hard aluminum gives very good results.

I have found that glass threads having diameters of from one-hundredth to three-hundredths of an inch formed of a large number of very fine glass fibers are particularly suited for use as the central core in the composite threads of my invention. Metallic ribbons varying in thickness from .0008 to .002 of an inch, and in width from .01 to ⅛ of an inch, have been used to form the spirally wound outer metal sheath. While the limits of these ranges of dimensions are not absolute, they afford a good working range. Many very satisfactory commercial adaptations of my invention have been made using aluminum ribbons having a thickness of .0015 of an inch, and widths of 1/50, 1/32 and 1/16 of an inch.

The most common method of making metallic ribbons is to pass a metallic sheet of the proper thickness and temper through a number of rotating cutters so spaced as to cut the sheet into ribbons of the proper width. Metallic ribbons produced in this manner may be used to form the spirally wound metallic sheaths of the composite threads of my invention. However, metallic ribbons produced in this manner have very fine ragged edges and I prefer to use a metallic ribbon produced by flattening a thin metallic wire, for example by causing a wire of appropriate diameter to pass between appropriately spaced rolls. The edges of metallic ribbons produced by flattening wire in this manner are round and smooth. When metal ribbons produced in this manner are spirally wound around glass threads or cores, the resulting composite threads are easier to weave, knit, braid, or otherwise manipulate in the fabrication of sheet materials or other articles therefrom. This method of producing metallic ribbons is especially adapted to the production of aluminum ribbons.

The spirally wound metallic ribbons may, if desired, be anchored to the glass core to prevent shifting along the axis of the core. Such anchorage is particularly desirable where the pitch of the spiral metallic winding is such as to produce only partial coverage of the central glass core. Such anchorage may be provided by passing the glass thread through a bath consisting of a solution or dispersion of a plastic resin, either before or after the metallic winding has been applied to the glass core and thereafter subjecting the composite thread to an appropriate treatment to set the plastic resin, as by heating to evaporate the solvent or to convert plastic resin particles into a cohesive mass. A wide variety of plastic resins are suitable for this purpose, for example, ethyl cellulose, cellulose nitrate, cellulose acetate, various natural and synthetic latices, polystyrenes, copolymers of vinyl acetate and vinyl chloride, and the like. The recently developed silicone varnishes or resins may also be used for this purpose and their use is particularly desirable where high temperatures are to be encountered.

For certain purposes an external resin coating of the spiral metallic winding, with or without a partial internal coating, is desirable. An external coating of the metallic winding, together with a partial internal coating, may be provided by immersing the metal-coated, or partially metal-coated, glass thread in a solution or dispersion of a suitable plastic resin, and thereafter applying an appropriate treatment to set the plastic resin as above described. However, where it is desired to provide an external coating of plastic resin only on the spiral metallic winding, it is frequently advantageous first to produce a laminated sheet of the resin and the metal foil, and then to cut the laminated sheet into ribbons which thereafter are used to form the spiral metallic winding on the central glass core. Such composite laminated sheets may be produced by coating an uncut metallic sheet with any of the well known lacquers, or by laminating a preformed plastic sheet to the metal sheet. Sheets of regenerated cellulose, or sheets of cellulose acetate, ethyl cellulose, polyvinyl acetate, rubber or rubber hydrochloride, or any similar plastic may be used in this manner. The plastic sheets may be either colored or clear. In composite threads in which the glass core thread is only partially covered by the metallic winding, many beautiful combinations may be secured by varying the color of the glass core thread and the color of the external plastic coating on the spiral metallic winding.

Several modifications of composite threads embodying my invention are illustrated, in greatly enlarged form, in the accompanying drawing:

Fig. 1 is an enlarged fragmentary view of a composite thread comprising a central core 10, consisting of a plurality of individual glass filaments or fibers twisted to form a glass thread, and an aluminum ribbon 11 wound around the central glass core to form a spiral in which the relationship of the pitch of the spiral to the width of the aluminum ribbon is such as to provide complete coverage of the central glass core.

Fig. 2 is a similar view of a modified form of composite thread in which the aluminum ribbon is wound around the central glass core 10 to form a spiral in which the relationship of the pitch of the spiral to the width of the aluminum ribbon is such as to provide only partial coverage of the central glass core; and Fig. 3 is a similar view of another composite thread in which two aluminum ribbons, 11 and 12 respectively, are wound around the central glass core 10 to form spirals each of which has a pitch substantially exceeding the sum of the widths of the aluminum ribbons so that the central glass core is not completely covered. In the modification here shown, the distance between successive aluminum strips measured along the axis of the central core is equal, so that at any point along the axis of the central core the separate metallic windings are in diametrically opposite positions on the outer surface of the central glass core.

Fig. 4 is an enlarged fragmentary view, partly in section, of a composite thread in which the glass core or thread 10 has a spirally wound aluminum ribbon 11 of a plastic resin; the plastic resin being applied to the glass core or thread by passing the latter through a bath consisting of a solution or dispersion of a suitable plastic resin before the metallic winding was applied thereto, and subsequently subjected to appropriate treatment to set it and cause the metallic ribbon to be anchored to the glass thread.

Fig. 5 is a view similar to Fig. 4 of another composite thread in which the glass core or thread 10 has the aluminum ribbon 11 bound thereto by an external resin coating 13'; the resin coating being applied to the ribbon-wound glass thread by immersing the latter in a solution or dispersion of a suitable plastic resin, and thereafter subjecting it to appropriate treatment to set the plastic resin.

Fig. 6 is an enlarged fragmentary view of a still further modified form of the composite thread in which the glass core or thread 10 is spirally wound with a laminated ribbon, previously cut from a laminated sheet consisting of an aluminum foil coated with a coating of set plastic resin. The composite ribbon is so wound onto the glass thread or core that the resin layer 14 forms an external coating on the aluminum ribbon 11.

Composite threads embodying my invention and articles fabricated therefrom are adapted to many special uses. For example, the metallic covering may serve as an electrical resistance element for voltage control devices or for heating elements. If it is to be used as an electrical resistance element of such a character that a single composite thread or group of threads are mounted on a non-conducting frame by which they are held in a spaced relationship, they need not be externally insulated. However, the composite threads of my invention, that is the metallic windings thereof, are admirably suited for use as a heating element in electrically heated blankets and electric heating pads, although when used for these purposes they should be provided with external electrical insulation. The form of composite thread illustrated in Fig. 3 is especially adapted to serve as an electrical condenser.

While I have described the central core of the composite threads of my invention as consisting of a single filament or plurality of filaments of glass, it will be understood that filaments or threads produced from fused quartz or from other fused ceramic materials that are generally the equivalent of glass with respect to tensile strength, flexibility when in fibrous form, and ability to resist fire and corrosion or disintegration by the action of chemicals, may be used in the central core in place of, or in combination with, glass filaments. Also, I have found that for certain uses wherein the high tensile strength afforded by glass fibers is desired only to a limited extent, and in which resistance to fire and chemical action is of lesser importance than resilience and extreme flexibility, filaments of cotton, rayon, nylon or other plastics may to advantage be mixed with glass filaments to form a heterogeneous thread or yarn which may serve as the central core about which the metallic strips are spirally wound.

I claim:

1. A composite thread comprising a central filamentary core of glass and a narrow strip of metal wound around the central core in the form of a spiral.

2. In a composite thread the combination of a central core comprising a plurality of glass fibers, and a narrow strip of metal foil wound around the central core in the form of a spiral.

3. In a composite thread the combination of a central core comprising a plurality of glass fibers, and a narrow strip of metal spirally wound around the central core, said narrow metal strip having rounded edges.

4. In a composite thread the combination of a central core comprising a plurality of glass fibers, and a thin metallic sheath completely covering the central core, said metallic sheath comprising a narrow strip of metal wound around the central core in the form of a spiral.

5. In a composite thread the combination of a central filamentary core of glass, and a narrow strip of metal wound around said core in the form of a spiral, successive turns of the spiral being spaced apart a distance such that the central core is only partially covered by the metallic winding.

6. In a composite thread the combination of a central filamentary core of glass, and a plurality of metal strips each wound around the central core in the form of a spiral having its successive turns spaced apart a distance greater than the combined width of said metal strips.

7. In a composite thread the combination of a central core comprising a plurality of glass fibers, and a narrow strip of metal wound around the central core in the form of a spiral, said spirally wound metal strip being anchored to the central core by a plastic resin.

8. In a composite thread the combination of a central core comprising a plurality of glass fibers, a narrow strip of metal wound around the central core in the form of a spiral, and an outer coating of plastic resin laminated to said metal strip.

9. In a composite thread the combination of a central core comprising a plurality of glass fibers, a narrow strip of metal wound around the central core in the form of a spiral, and a coating of cellulose acetate on said metal strip.

10. In a sheet material the combination of a plurality of interlocked composite threads, said composite threads having central cores comprising a plurality of glass fibers, and narrow strips of metal wound around the central cores in the form of spirals.

11. A structure formed by bonding together a plurality of composite threads, said composite threads having central cores comprising a plurality of glass fibers, and narrow strips of metal wound around the central cores in the form of spirals.

12. In a composite thread the combination of a central core consisting of a plurality of glass fibers, and a narrow strip of aluminum foil wound around the central core in the form of a spiral.

13. In a composite thread the combination of a central core comprising a plurality of glass fibers, and a thin narrow strip of aluminum spirally wound around the central core, said aluminum strip having rounded edges.

14. In a sheet material the combination of a plurality of interlocked composite threads, said composite threads having central cores comprising a plurality of glass fibers, and narrow strips of aluminum foil wound around the central cores in the form of spirals.

15. In a sheet material the combination of a plurality of interlocked composite threads, said composite threads having central cores comprising a plurality of glass fibers, and narrow strips of aluminum wound around the central cores in the form of spirals, said narrow aluminum strips having rounded edges.

16. In a composite filamentary structure the combination of a central core consisting of a glass thread having a diameter approximating .01–.03 of an inch, and a metallic sheath comprising a narrow strip of metal wound around said glass thread in the form of a spiral.

17. In a composite filamentary structure the combination of a central core consisting of a glass thread having a diameter approximating .01–.03 of an inch, and a metallic sheath comprising a strip of metal wound around said glass thread in the form of a spiral said metallic strip having a thickness approximating .0002–.008 of an inch and a width approximating .01–.125 of an inch.

ARTHUR BIDDLE.

REFERENCES CITED

The following references are of record in the file of this patent:

UNITED STATES PATENTS

| Number | Name | Date |
|---|---|---|
| 327,493 | Spalding | Sept. 29, 1885 |
| 1,468,323 | Olson | Sept. 18, 1923 |
| 1,822,189 | Zapf | Sept. 8, 1931 |
| 1,961,833 | Staples | June 5, 1934 |
| 1,966,509 | Lynn | July 17, 1934 |
| 2,058,783 | Franke | Oct. 27, 1936 |
| 2,193,429 | McConnell | Mar. 12, 1940 |

FOREIGN PATENTS

| Number | Country | Date |
|---|---|---|
| 278,791 | Italy | Oct. 20, 1930 |